United States Patent
Falke et al.

(10) Patent No.: US 6,586,486 B2
(45) Date of Patent: *Jul. 1, 2003

(54) PREPARATION OF LOW-DENSITY HYDROPHILIC FLEXIBLE POLYURETHANE FOAMS

(75) Inventors: Peter Falke, Schwarzheide (DE); Heinz-Dieter Lutter, Diepholz (DE); Michael J. Pcolinski, Bloomfield, MI (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/047,640

(22) Filed: Jan. 15, 2002

(65) Prior Publication Data

US 2002/0151614 A1 Oct. 17, 2002

(30) Foreign Application Priority Data

Feb. 6, 2001 (DE) .......................... 101 05 559

(51) Int. Cl.$^7$ .............................. C08G 18/14
(52) U.S. Cl. ................. 521/124; 521/125; 521/126; 521/127; 521/128; 521/129; 521/130; 521/159; 521/170; 521/174
(58) Field of Search ................. 521/124, 125, 521/126, 127, 128, 129, 130, 159, 170, 174

(56) References Cited

U.S. PATENT DOCUMENTS

| | | | | |
|---|---|---|---|---|
| 5,306,737 A | * | 4/1994 | Burkhart et al. ............. | 521/112 |
| 5,369,138 A | * | 11/1994 | Gansen ........................ | 521/159 |
| 5,420,170 A | * | 5/1995 | Lutter et al. ............. | 252/182.24 |
| 5,521,226 A | * | 5/1996 | Bleys ......................... | 521/137 |
| 5,594,097 A | * | 1/1997 | Chaffanjon et al. .... | 252/182.27 |
| 5,686,502 A | * | 11/1997 | Murray et al. .............. | 521/130 |
| 5,863,961 A | * | 1/1999 | Jacobs et al. ............... | 521/174 |
| 6,156,864 A | * | 12/2000 | Ohkubo et al. ............. | 521/159 |
| 6,239,186 B1 | * | 5/2001 | Mansfield et al. .......... | 521/112 |
| 6,245,825 B1 | * | 6/2001 | Bleys ......................... | 521/137 |
| 6,322,722 B1 | * | 11/2001 | Bhattacharjee et al. | 252/182.24 |
| 6,391,933 B1 | * | 5/2002 | Mattesky .................... | 521/114 |
| 6,417,241 B1 | * | 7/2002 | Huygens et al. ............ | 521/130 |

\* cited by examiner

Primary Examiner—John M. Cooney, Jr.
(74) Attorney, Agent, or Firm—Fernando A. Borrego

(57) ABSTRACT

Low-density hydrophilic flexible polyurethane foams are prepared by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and, if required, further assistants and additives (f), by a process in which the polyetherol mixture (b) consists of b1) at least one difunctional or polyfunctional polyetherol based on propylene oxide and/or butylene oxide and ethylene oxide, having an ethylene oxide content of more than 40% by weight, based on the total amount of alkylene oxide used, an OH number of from 20 to 120 mg KOH/g and a proportion of primary OH groups of more than 20% and b2) at least one difunctional or polyfunctional polyetherol based on propylene oxide and/or butylene oxide and, if required, ethylene oxide, the ethylene oxide content being not more than 40% by weight, and having an OH number of more than 25 mg KOH/g, water in amounts of up to 15% by weight, based on the total weight of the components (b) to (f), and a mixture of gel catalysts and blowing catalysts are used and the foaming is effected in an index range of from 20 to 120. Furthermore, the flexible polyurethane foams themselves produced in this manner are used as upholstery material, as energy-absorbing material and in the cosmetics and hygiene sectors.

15 Claims, No Drawings

PREPARATION OF LOW-DENSITY HYDROPHILIC FLEXIBLE POLYURETHANE FOAMS

The present invention relates to a process for the preparation of low-density hydrophilic flexible polyurethane foams by reacting organic and/or modified organic polyisocyanates (a) with a specific polyetherol mixture (b) and, if required, further compounds (c) having hydrogen atoms reactive toward isocyanates, in the presence of water and/or blowing agents (d), catalysts (e) having a specific gel catalyst/blowing catalyst ratio and, if required, further assistants and additives (f).

The preparation of flexible polyurethane foams by reacting organic and/or modified organic polyisocyanates or prepolymers with compounds having a higher functionality and at least two reactive hydrogen atoms, for example polyoxyalkylenepolyamines and/or preferably organic polyhydroxy compounds, in particular polyetherols, having molecular weights of from 300 to 6000, and, if required, chain extenders and/or crosslinking agents having molecular weights of up to 400, in the presence of catalysts, blowing agents, flameproofing agents, assistants and/or additives, is known and has been widely described. A review of the preparation of flexible polyurethane foams is given, for example, in Kunststoff-Handbuch, Volume VII, Polyurethane, 1st Edition 1966, edited by Dr. R. Vieweg and Dr. A. Höchtlen, and 2nd Edition, 1983, and 3rd Edition, 1993 edited in each case by Dr. G. Oertel (Carl Hanser Verlag, Munich).

Water is preferably used as the blowing agent, particularly in the case of flexible polyurethane foams. In the reaction with the corresponding isocyanates, ureas form and are to a large extent responsible for rigidity-determining properties. It is understandable and obvious that in particular the method of water addition and the amount of water used are of great importance for the foam properties.

EP-A-793681 describes the preparation of flexible foams. First, an NCO prepolymer having an NCO content of from 3 to 15% by weight is prepared using a polyol which comprises at least 50% of ethylene oxide units. The amount of water used accounts for from 1.5 to 5 times the amount of prepolymer, based on weight. In order to produce the foam, the water used must additionally be at least from 10 to 50° C. warmer than the NCO prepolymers. This requires complicated technological steps.

WO-A-9534591 uses a specific prepolymer composition which consists of two substantial components. A prepolymer having an NCO content of from 5 to 15% by weight is produced by reaction with a flexible-foam polyol (ethylene oxide content from 5 to 25%) and said prepolymer is combined, in the polyurethane formation, with a second isocyanate component (not prepolymerized) having an NCO content of from 30 to 33% by weight. This is said to contribute toward better processibility of the highly viscous prepolymer. From 2 to 8 parts of water are used. The polyol component used in addition to the polyol employed in the prepolymer is an ethylene oxide-rich polyol (>80% of ethylene oxide), in amounts of from 5 to 25 parts by weight.

U.S. Pat. No. 4,144,386 claims the preparation of low-density foam by using a combination of blowing agents. In addition to relatively high water contents, in particular relatively large amounts of CFCs are used. This route is prohibited for environmental protection reasons.

U.S. Pat. No. 4,137,200 describes the reaction of an NCO prepolymer mixture, consisting of a prepolymer based on polyethylene glycol and a prepolymer based on a flexible-foam polyol, and unreacted isocyanates and large amounts of water, to give a flexible slabstock foam, it being necessary to cool down the water used by mixing in ice.

In WO-A-9616099, U.S. Pat. No. 5,591,779 and EP-A-894814, large amounts of water are reacted with an NCO prepolymer (from 3 to 15% by weight of NCO, based on ethylene oxide-rich polyols), it being necessary for the temperature of the reacted water to be from 10 to 50° C. above the temperature of the prepolymer, which complicates the preparation process. Superabsorbers are used as process additives.

WO-A-9429361 (EP-A-707607) describes the use of a prepolymer (>85% of 4,4'-MDI) having an NCO content of from 5 to 10%, which was obtained by reaction with an ethylene oxide-rich flexible-foam polyol. Foaming is effected with water contents of >20 parts per 100 parts of prepolymer.

DE-A-3819940 claims TDI foams, hexamethylene diisocyanate foams and isophorone diisocyanate foams, which are each prepared by foaming the pure isocyanates with water at low indices.

EP-A-346670 discloses a process for the preparation of flexible foams using high water contents. Here, specific TDI mixtures, frequently containing TDI 65, in addition to hexamethylene diisocyanate and isophorone diisocyanate, are claimed, indicating that this process is unsuitable for MDI-containing isocyanates. Mixtures of random ethylene oxide/propylene oxide polyetherols are used as polyols.

WO-A-9534589 is based on the use of an isocyanate combination. The crystallization problems of the 4,4'-MDI-rich NCO components are evidently supposed to be overcome by prepolymerization. An isocyanate mixture having a higher functionality is also used. Low-density flexible slabstock foams are produced.

WO-A-9606874 claims water-blown flexible foams, a monofunctional polyether alcohol having high ethylene oxide contents being required as a process assistant. Up to 10 parts of water are said to be capable of being processed using the system. However, the use of monofunctional components is disadvantageous for the level of properties.

In U.S. Pat. No. 4,110,508, NCO prepolymers based on polyethylene glycols are reacted at a water index of from 4000 to 40000 in order thereby to produce foam-textile composites in which the foam does not penetrate into the textile material.

U.S. Pat. No. 4,365,025 describes the reaction of an NCO prepolymer comprising ethylene oxide-rich polyols and a polyisocyanate with water. Owing to the low NCO content, the prepolymers used have a high viscosity and are in fact diluted with the polyisocyanate. Owing to the stabilizers used, the foaming process is difficult to control.

DE-A-3721056 describes cold-curing flexible foams which are produced using high water contents at an index of <70. Owing to the relatively low content of ethylene oxide in the polyols used, mixing problems are to be expected with the high water content.

EP-A-392788 claims the production of NCO prepolymers having an NCO content of from 2 to 12% by weight, high viscosities being achieved. These prepolymers are reacted with a mixture which comprises 95% of water. Owing to the disadvantageous mixing ratios and the large viscosity differences, these foams are difficult to process.

In EP-A-566247, NCO prepolymers having an NCO content of from 2 to 15% by weight are reacted with a polyol component containing 50% of water. A 1,2-dialkylimidazole is required as a special catalyst.

In WO-A-9719971, the isocyanate component described consists of an NCO prepolymer (NCO content: from 9 to 20% by weight) with an unprepolymerized polymethylene-polyphenylene polyisocyanate (PMDI), if required as a mixture with TDI. From 3 to 15 parts of water are used as a blowing agent. Here too, the mixing with the pure isocyanate component evidently serves for improving the processibility of the isocyanate component.

EP-A-578381 describes a cold-molded foam prepared by reacting an NCO component, consisting of an MDI prepolymer which is subsequently mixed with PMDI, using water as the sole blowing agent. During foaming, a defined excess pressure is applied by means of the mold geometry, in order to obtain satisfactory moldings.

EP-A-769510 once again claims a flexible PU foam preparation by reaction of an NCO prepolymer with an excess of water. The polyol component used in said prepolymer is a flexible-foam polyol having an ethylene oxide content of from 0 to 30% by weight. Owing to the disadvantageous mixing ratios, the foam preparation is to be considered as demanding.

EP-A-547765 describes an isocyanate composition which comprises at least >85% of 4,4'-MDI and is prepared substantially with an ethylene oxide-rich polyol using water as blowing agent. Such 4,4'-MDI-rich components are difficult to handle owing to the tendency of the MDI to crystallize.

EP-A-566248 describes the reaction of an NCO component, which consists of two different prepolymers, with a mixture of water, catalyst and stabilizer. In contrast to analogous variants, the second isocyanate component used is not pure PMDI but a somewhat prepolymerized PMDI, so that once again the processibility is said to be improved. The preparation and mixing of two prepolymers are complicated.

The inventions mentioned in the prior art all permit the preparation of flexible polyurethane foams which have a low density. The disadvantage of these processes is often the high viscosity, particularly of the isocyanate component, and the complicated processing.

It is an object of the present invention to provide a process for the preparation of flexible polyurethane foams, in which in particular the processibility of the foams is ensured in a wide range by means of the polyol combination used, and which permits a low density in conjunction with good water absorptivity of the foams by the use of high water contents.

We have found, surprisingly, that this object is achieved if a specific polyol combination, based predominantly on ethylene oxide-rich polyetherols in combination with low-ethylene oxide polyetherols is used, which combination can be processed in a wide index range, a mixture of gel catalysts and blowing catalysts being used.

The present invention accordingly relates to a process for the preparation of low-density hydrophilic flexible polyurethane foams by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and, if required, further assistants and additives (f), wherein the polyetherol mixture (b) consists of b1) at least one difunctional or polyfunctional polyetherol based on propylene oxide and/or butylene oxide and ethylene oxide, having an ethylene oxide content of more than 40% by weight, based on the total amount of alkylene oxide used, an OH number of from 20 to 100 mg KOH/g and a content of primary OH groups of more than 20% and b2) at least one difunctional or polyfunctional polyetherol based on propylene oxide and/or butylene oxide and, if required, ethylene oxide, the ethylene oxide content being not more than 40% by weight, and having an OH number of more than 25 mg KOH/g, water in amounts of up to 15% by weight, based on the total weight of the components (b) to (f), and a mixture of gel catalysts and blowing catalysts are used and the foaming is effected in an index range of from 20 to 120.

The present invention furthermore relates to the flexible polyurethane foams themselves, prepared in this manner, and their use as upholstery material, as energy-absorbing material and in the cosmetic and hygiene sectors.

In our investigations, we surprisingly found that a flexible foam which has a soft handle and a uniform foam structure is obtained by using the novel combination of the polyetherols (b) and a mixture of gel catalysts and blowing catalysts while maintaining the further novel process characteristics. A person skilled in the art would actually have expected that coarse-cell foams having a straw-like handle (result of the urea moieties formed) would be obtained.

Regarding the components used according to the invention in the polyol mixture, the following may be stated:

The component (b1) consists of at least one difunctional or polyfunctional polyetherol based on propylene oxide and/or butylene oxide and ethylene oxide, having an ethylene oxide content of more than 40, preferably more than 60, % by weight, based in each case on the total amount of alkylene oxide used, an OH number of from 20 to 120, preferably from 30 to 60, mg KOH/g and a content of primary OH groups of more than 20%, preferably from 40 to 85%.

For example, the following are suitable as (b1) for this purpose: polyetherols based on ethylene glycol, glycerol or trimethylolpropane as an initiator, having an ethylene oxide block or having randomly incorporated ethylene oxide. Polyetherols based on glycerol and having an ethylene oxide endcap are preferably used but a propylene oxide endcap may also be used.

The polyetherols (b1) are preferably used in amounts of more than 50, in particular from 60 to 90, % by weight, based in each case on the total weight of the component (b).

The component (b2) consists of at least one difunctional or polyfunctional polyetherol based on propylene oxide and/or butylene oxide and, if required, ethylene oxide, the ethylene oxide content being not more than 40% by weight, and having an OH number of more than 25, preferably more than 40, mg KOH/g.

For example, the following are suitable as (b2) for this purpose: polyetherols based on propylene glycol, glycerol, toluenediamine and sorbitol and propylene oxide. Ethylene oxide may be incorporated in amounts of up to 40% by weight. Polyether alcohols based on propylene oxide with propylene glycol as an initiator are preferably used.

The polyetherols (b2) are preferably used in amounts of less than 30, in particular from 10 to 20, % by weight, based in each case on the total weight of the component (b).

Said polyetherols are prepared by known processes, as described by way of example further below.

The novel flexible polyurethane foams are prepared by reacting organic and/or modified organic polyisocyanates (a) with the polyetherol mixture (b) described above and, if required, further compounds (c) having hydrogen atoms reactive toward isocyanates, in the presence of water and/or other blowing agents (d), catalysts (e) and, if required, further assistants and additives (f).

According to the invention, the foams are prepared at indices of from 20 to 120, preferably from 40 to 90.

Regarding the further starting components which may be used, the following may be stated specifically:

Suitable organic polyisocyanates (a) for the preparation of the novel polyurethanes are the aliphatic, cycloaliphatic, araliphatic and preferably aromatic polyfunctional isocyanates known per se.

Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanates and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably di- and polyisocyanates, such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates can be used individually or in the form of their mixtures.

Tolylene diisocyanate, mixtures of diphenylmethane diisocyanate isomers, mixtures of diphenymethane diisocyanate and crude MDI or tolylene diisocyanate with diphenylmethane diisocyanate and/or crude MDI are preferably used. Mixtures containing more than 30% by weight of diphenylmethane 2,4'-diisocyanate are particularly preferably used.

Frequently, modified polyfunctional isocyanates, i.e. products which are obtained by chemical reaction of organic di- and/or polyisocyanates are also used. Examples are di- and/or polyisocyanates containing ester, urea, biuret, allophanate, carbodiimide, isocyanurate, uretdione and/or urethane groups. Specific examples are organic, preferably aromatic, polyisocyanates containing urethane groups and having NCO contents of from 43 to 15, preferably from 31 to 21, % by weight, based on the total weight, diphenylmethane 4,4'-diisocyanate modified by reaction, for example with low molecular weight diols, triols, dialkylene glycols, trialkylene glycols or polyalkylene glycols having molecular weights up to 6000, in particular up to 1500, modified diphenylmethane 4,4'- and 2,4'-isocyanate mixtures or modified crude MDI or tolylene 2,4- or 2,6-diisocyanate. The di- or polyoxyalkylene glycol can be used individually or as mixtures, examples being diethylene and dipropylene glycol, polyoxyethylene, polyoxypropylene and polyoxypropylenepolyoxyethylene glycols, triols and/or tetrols. Also suitable are NCO-containing prepolymers having NCO contents of from 25 to 3.5, preferably from 21 to 14, % by weight, based on the total weight, prepared from the polyesterpolyols and/or preferably polyetherpolyols described below and diphenylmethane 4,4'-diisocyanate, mixtures of diphenylmethane 2,4'- and 4,4'-diisocyanate, tolylene 2,4- and/or 2,6-diisocyanates or crude MDI. Liquid polyisocyanates containing carbodiimide groups and/or isocyanurate rings and having NCO contents of from 43 to 15, preferably from 31 to 21, % by weight, based on the total weight, for example based on diphenylmethane 4,4'-, 2,4'- and/or 2,2'-diisocyanate and/or tolylene 2,4- and/or 2,6-diisocyanate, have also proven useful.

The modified polyisocyanates can be mixed with one another or with unmodified organic polyisocyanates, e.g. diphenylmethane 2,4'- or 4,4'-diisocyanate, crude MDI or tolylene 2,4- and/or 2,6-diisocyanate.

Modified organic polyisocyanates which have proven particularly useful are NCO-containing prepolymers which are advantageously formed by reaction of at least parts of the components (a), (b) and, if required, (c) and/or (d), particularly those which contain the component (b1) at least in a proportionate amount.

In addition to the polyetherol mixture (b) described above and used according to the invention, further compounds (c) having hydrogen atoms reactive toward isocyanates are added if required.

Compounds having at least two reactive hydrogen atoms are primarily suitable for this purpose. Those having a functionality of from 2 to 8, preferably from 2 to 3, and an average molecular weight of from 300 to 8000, preferably from 300 to 5000, are expediently used. The hydroxyl number of the polyhydroxy compounds is as a rule from 20 to 160, preferably from 28 to 56.

The polyetherpolyols used in the components (b) and (c) are prepared by known processes, for example by anionic polymerization using alkali metal hydroxides, e.g. sodium hydroxide or potassium hydroxide, or alkali metal alcoholates, e.g. sodium methylate, sodium ethylate, potassium ethylate or potassium isopropylate, as catalysts and with addition of at least one initiator which contains from 2 to 8, preferably 2 or 3, bonded reactive hydrogen atoms per molecule, or by cationic polymerization using Lewis acids, such as antimony pentachloride, boron fluoride etherate, etc., or bleaching earths as catalysts or by double metal cyanide catalysis from one or more alkylene oxides having 2 to 4 carbon atoms in the alkylene radical. For specific intended uses, monofunctional initiators may also be incorporated into the polyether structure.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures.

Examples of suitable initiator molecules are water, organic dicarboxylic acids, such as succinic acid, adipic acid, phthalic acid and terephthalic acid, aliphatic and aromatic, unsubstituted or N-monoalkyl-, N,N-dialkyl- and N,N'-dialkyl-substituted diamines having 1 to 4 carbon atoms in the alkyl radical, such as unsubstituted or monoalkyl- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamine, 2,3-, 2,4- and 2,6-toluenediamine and 4,4'-, 2,4'- and 2,2'-diaminodiphenylmethane. Other suitable initiator molecules are alkanolamines, e.g. ethanolamine, N-methyl- and N-ethylethanolamine, dialkanolamines, e.g. diethanolamine, N-methyl- and N-ethyldiethanolamine, and trialkanolamines, e.g. triethanolamine, and ammonia. Polyhydric, in particular dihydric and/or trihydric, alcohols, such as ethanediol, 1,2- and 2,3-propanediol, diethylene glycol, dipropylene glycol, 1,4-butanediol, 1,6-hexanediol, glycerol, trimethylolpropane and pentaerythritol, are preferably used.

The polyetherpolyols, preferably polyoxypropylenepolyols and polyoxypropylenepolyoxyethylenepolyols, have a functionality of, preferably, from 2 to 8, in particular from 2 to 3, and molecular weights of from 300 to 8000, preferably from 300 to 6000, in particular from 1000 to 5000, and suitable polyoxytetramethylene glycols have a molecular weight of up to about 3500 and suitable polyoxytetramethylene glycol have a molecular weight of up to about 3500.

Other suitable polyetherpolyols are polymer-modified polyetherpolyols, preferably graft polyetherpolyols, in particular those based on styrene and/or acrylonitrile, which are prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyetherpolyols, analogously to German Patents 1111394, 1222669 (U.S. Pat. Nos. 3,304,273, 3,383,351, 3,523,093), 1152536 (GB 1040452) and 1152537 (GB 987618), and polyetherpolyol dispersions which contain, as the disperse phase, usually in an amount of from 1 to 50, preferably from 2 to 25, % by weight of, for example, polyureas, polyhydrazides, polyurethanes containing bonded tert-amino groups and/or melamine, and which are described, for example, in EP-B-011752 (U.S. Pat. No. 4,304,708), U.S. Pat. No. 4,374,209 and DE-A-3231497.

The polyetherpolyols can be used individually or in the form of mixtures.

In addition to the polyetherpolyols described, it is also possible to use, for example, polyetherpolyamines and/or further polyols selected from the group consisting of the polyesterpolyols, polythioetherpolyols, polyesteramides, hydroxyl-containing polyacetals and hydroxyl-containing aliphatic polycarbonates or mixtures of at least two of said polyols. The hydroxyl number of the polyhydroxy compounds is as a rule from 20 to 80, preferably from 28 to 56.

Suitable polyesterpolyols can be prepared, for example, from organic dicarboxylic acids of 2 to 12 carbon atoms, preferably aliphatic dicarboxylic acids of 4 to 6 carbon atoms, polyhydric alcohols, preferably diols, of 2 to 12, preferably 2 to 6, carbon atoms, by conventional processes. Usually, the organic polycarboxylic acids and/or derivatives thereof and polyhydric alcohols, advantageously in a molar ratio of from 1:1 to 1:1.8, preferably from 1:1.05 to 1:1.2, are subjected to polycondensation in the absence of a catalyst or preferbaly in the presence of esterification catalysts, expediently in an atmosphere comprising inert gas, e.g. nitrogen, carbon monoxide, helium, argon, etc., in the melt at from 150 to 250° C., preferably from 180 to 220° C., under atmospheric or reduced pressure, to the desired acid number, which is advantageously less than 10, preferably less than 2.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerization of cyclic acetals. Suitable hydroxyl-containing polycarbonates are those of the type known per se, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene. The polyesteramides include, for example, the predominantly linear condensates obtained from polybasic, saturated and/or unsaturated carboxylic acids or their anhydrides and polyhydric saturated and/or unsaturated amino alcohols and mixtures of polyhydric alcohols and amino alcohols and/or polyamines. Suitable polyetherpolyamines can be prepared from the abovementioned polyetherpolyols by known processes. The cyanoalkylation of polyoxyalkylenepolyols and subsequent hydrogenation of the nitrile formed (U.S. Pat. No. 3,267,050) or the partial or complete amination of polyoxyalkylenepolyols with amines or ammonia in the presence of hydrogen and catalysts (DE-A-1215373) may be mentioned by way of example.

The compounds of component (c) can be used individually or in the form of mixtures.

The flexible polyurethane foam can be prepared in the presence or absence of chain extenders and/or crosslinking agents, although these are generally not required. Chain extenders and/or crosslinking agents used are diols and/or triols having molecular weights of less than 400, preferably from 60 to 300. Suitable for example, are aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl) hydroquinone, triols, such as 1,2,4- and 1,3,5-dihydroxycyclohexane, triethanolamine, diethanolamine, glycerol and trimethylolpropane, and low molecular weight hydroxyl-containing polyalkylene oxides based on ethylene oxide and/or 1,2-propylene oxide and the abovementioned diols and/or triols as initiator molecules.

If chain extenders, crosslinking agents or mixtures thereof are used for the preparation of the polyurethane foams, they are expediently employed in an amount of up to 10% by weight, based on the weight of the polyol compounds.

According to the invention, water in amounts of form 0.5 to 15, preferably from 1 to 10, particularly preferably from 3 to 10, % by weight, based in each case on the total weight of the components (b) to (f), is used as blowing agent (d).

The addition of water can be effected in combination with other conventional blowing agents. For example, the chlorofluorocarbons (CFCs) generally known from polyurethane chemistry and highly fluorinated and/or perfluorinated hydrocarbons are suitable for this purpose. However, the use of these substances is greatly restricted or being completely discontinued for ecological reasons. In addition to chlorofluorocarbons and fluorocarbons, in particular aliphatic and/or cycloaliphatic hydrocarbons, especially pentane and cyclopentane, or acetals, e.g. methylal, are possible alternative blowing agents. These physical blowing agents are usually added to the polyol component of the system. However, they can also be added to the isocyanate component or, as a combination, to both the polyol component and the isocyanate component. They may also be used together with highly fluorinated and/or perfluorinated hydrocarbons, in the form of an emulsion of the polyol component. Usually oligomeric acrylates which contain polyoxyalkylene and fluoroalkane radicals as side groups and have a fluorine content of from about 5 to 30% by weight are employed as emulsifiers, where they are used. Such products are sufficiently well known from plastics chemistry, e.g. EP-A-0351614. The amount of the blowing agent or blowing agent mixture which may be used in addition to water is advantageously from 1 to 10, preferably from 1 to 3, % by weight, based in each case on the total weight of the components (b) to (d).

Catalysts (e) used for the preparation of the flexible polyurethane foams are in particular compounds which greatly accelerate the reaction of the reactive hydrogen atoms, in particular of hydroxyl-containing compounds of components (b), (c) and (d), with the organic, unmodified or modified polyisocyanates (a).

According to the invention, a mixture of gel catalysts and blowing catalysts is used.

Suitable gel catalysts are advantageously amine gel catalysts, organometallic gel catalysts or any desired mixtures of amine and organometallic gel catalysts. These catalysts accelerate the reaction of the isocyanates with the polyols.

The amine gel catalyst used is, for example, diazabicycloundecane or, preferably, 1,4-diazabicyclo[2.2.2]octane (Dabco).

Suitable organometallic gel catalysts are organic metal compounds, preferably organic tin compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate.

Examples of suitable blowing catalysts, which in particular favor the reaction of the isocyanate with the water, are tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl) urea, dimethylpiperazine, 1,2-dimethylimidazole, 1-azabicyclo[3.3.0]octane, and aminoalkanol compounds, such as triethanolamine, triisopropanolamine, N-methyl- and N-ethyldiethanolamine and dimethylethanolamine.

In addition to the gel catalysts and blowing catalysts, further catalysts customary in polyurethane chemistry may be present. For example, the following are suitable for this purpose: tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxide, such as sodium hydroxide, and alkali metal alcoholates, such as sodium methylate and potassium isopropylate, and alkali metal salts of long-chain fatty acids having 10 to 20 carbon atoms and, if required, OH side groups. These catalysts can be used only to a limited extent for flexible foams and support the PIR reaction.

Advantageously, amine gel catalysts are used in combination with blowing catalysts, the weight ratio of amine gel catalysts to blowing catalysts preferably being greater than 1, in particular greater than 2, particularly preferably greater than 3.

It is also possible to use organometallic gel catalysts in combination with blowing catalysts, the weight ratio of organometallic gel catalysts to blowing catalysts preferably being less than 1.

It is of course also possible to use any desired mixtures of amine and organometallic gel catalysts in combination with blowing catalysts, in which case the weight ratio of the gel catalysts to the blowing catalysts is preferably less than 2.

If, in addition to the gel catalysts and blowing catalysts, further catalysts customary in polyurethane chemistry are present, they are preferably used in amounts of not more than 0.5% by weight, based on the weight of the components (b) to (f).

Altogether, the total amount of catalyst combination is preferably less than 2, in particular less than 1, % by weight, based on the weight of the components (b) to (f).

If required, further assistants and/or additives (f) may also be incorporated into the reaction mixture for the preparation of the novel flexible polyurethane foams. Examples are flameproofing agents, stabilizers, fillers, dyes, pigments and hydrolysis stabilizers as well as fungistatic and bacteriostatic substances.

Examples of suitable flameproofing agents are tricresyl phosphate, tris(2-chloroethyl) phosphate, tris(2-chloropropyl) phosphate, tetrakis(2-chloroethyl) ethylene diphosphate, dimethyl methanephosphonate, diethyl diethanolaminomethylphosphonate and commercial halogen-containing polyol flameproofing agents. In addition to the abovementioned halogen-substituted phosphates, inorganic or organic flameproofing agents, such as red phosphorus, hydrated alumina, antimony trioxide, arsenic oxide, ammonium polyphosphate and calcium sulfate, expanded graphite or cyanuric acid derivatives, e.g. melamine, or mixtures of at least two flameproofing agents, e.g. ammonium polyphosphate and melamine, and, if required, corn starch or ammonium polyphosphate, melamine and expanded graphite and/ or, if required, aromatic polyesters may also be used for flameproofing the polyisocyanate polyadducts. Additions of melamine have proven particularly effective. In general, it has proven expedient to use from 5 to 50, preferably from 5 to 25, parts by weight of said flameproofing agents per 100 parts by weight of the components (b) to (f).

The stabilizers used are in particular surface-active substances, i.e. compounds which serve for supporting the homogenization of the starting materials and may also be suitable for regulating the cell structure of the plastics. Examples are emulsifiers, such as the sodium salts of castor oil sulfates or fatty acids and salts of fatty acids with amines, for example of oleic acid with diethylamine, of stearic acid with diethanolamine and of ricinoleic acid with diethanolamine, salts of sulfonic acids, for example alkali metal or ammonium salts of dodecylbenzene- or dinaphthylmethanedisulfonic acid and ricinoleic acid; foam stabilizers, such as siloxane/oxyalkylene copolymers and other organopolysiloxanes, oxyethylated alkylphenols, oxyethylated fatty alcohols, liquid paraffins, castor oil esters or ricinoleic esters, turkey red oil and peanut oil, and cell regulators, such as paraffins, fatty alcohols and dimethylpolysiloxanes. Stabilizers used are predominantly organopolysiloxanes which are water-soluble. These comprise polydimethylsiloxane radicals onto which a polyether chain of ethylene oxide and propylene oxide has been grafted. The surface-active substances are usually used in amounts of from 0.01 to 5 parts by weight, based on 100 parts by weight of the components (b) to (f).

Fillers, in particular reinforcing fillers, are to be understood as meaning the conventional organic and inorganic fillers, reinforcing agents, weighting agents, compositions for improving the abrasion behavior in surface coatings, coating materials, etc., which are known per se. Specific examples are inorganic fillers, such as silicate minerals, for example sheet silicates, such as antigorite, serpentine, hornblendes, amphibole, chrysotile and talc, metal oxides, such as kaolin, aluminas, titanium oxides and iron oxides, metal salts, such as chalk, barite and inorganic pigments, such as calcium sulfide and zinc sulfide, as well as glass, etc. Kaolin (china clay), aluminum silicate and coprecipitates of barium sulfate and aluminum silicate and natural and synthetic fibrous minerals, such as wollastonite, metal fibers and in particular glass fibers of various lengths, which, if required, may be sized, are preferably used. Examples of suitable organic fillers are carbon, rosin, cyclopentadienyl resins and graft polymers and cellulosic fibers, polyamide, polyacrylonitrile, polyurethane and polyester fibers based on aromatic and/or aliphatic dicarboxylic esters, and in particular carbon fibers. The inorganic and organic fillers may be used individually or as mixtures and are incorporated into the reaction mixture advantageously in amounts of from 0.5 to 50, preferably from 1 to 40, % by weight, based on the weight of the components (a) to (f), but the content of mats, nonwovens and woven fabrics of natural and synthetic fibers may reach values up to 80.

Further information on the abovementioned other conventional assistants and additives are to be found in the technical literature, for example in the monograph by J. H. Saunders and K. C. Frisch, High Polymers, Volume XVI, Polyurethanes, Parts 1 and 2, Interscience Publishers 1962 and 1964, or the above-cited Kunststoffhandbuch, Polyurethane, Volume VII, Hanser-Verlag Munich, Vienna, 1st to 3rd Editions.

For the preparation of the novel foams, the organic and/or modified organic polyisocyanates (a), the polyetherol mixture (b) and, if required, further compounds (c) having hydrogen atoms reactive toward isocyanates and further components (d) to (f) are reacted in amounts such that the ratio of the number of equivalents of NCO groups of the polyisocyanates (a) to the sum of the reactive hydrogen atoms of the components (b) to (f) is from 0.20:1 to 1.2:1, preferably from 0.4:1 to 0.9:1.

Polyurethane foams obtained by the novel process are advantageously prepared by continuously applying the reaction mixture to suitable belt lines for producing slabstock foam. The use of the one-shot process in which, for example, the mixture to be foamed is introduced into open or closed molds, for example metallic molds, by means of the high-pressure or low-pressure technique is also customary.

It has proven particularly advantageous to employ the belt process. There, the part-components are combined via a mixing head and discharged onto the belt. It is also customary to use premixes of the components (b) to (f) which are then reacted with the isocyanate component in the mixing head.

It is also possible to employ the two-component process and to combine the components (b) to (f) to give a polyol component, often also referred to as component A, and to use the organic and/or modified organic polyisocyanates (a), particularly preferably an NCO prepolymer or mixtures of this prepolymer and further polyisocyanates, and, if required, blowing agents (d) as the isocyanate component, often also referred to as component B.

The starting components are mixed at from 15 to 90° C., preferably from 20 to 60° C., in particular from 20 to 35° C., and introduced into the open mold or, if necessary under superatmospheric pressure, into the closed mold or, in the case of a continuous workstation, are applied to a belt which receives the reaction material. The mixing can be carried out mechanically by means of a stirrer, by means of a stirring screw or by high-pressure mixing in a nozzle. The mold temperature is expediently from 20 to 110° C., preferably from 30 to 60° C., in particular from 35 to 55° C.

The polyurethane foams prepared by the novel process have a density of from 10 to 800, preferably from 30 to 100, in particular from 20 to 60, kg/m³. They are particularly suitable as upholstery material for seating in the furniture sector, as energy-absorbing material and in the cosmetics and hygiene sectors.

The examples which follow illustrate the invention without restricting it.

EXAMPLES

A flexible polyurethane foam according to the components shown in table 1 was prepared by foaming with water as the blowing agent.

TABLE 1

| Experiment | 1 | 2 | 3 | 4 |
|---|---|---|---|---|
| Polyol 1 (b1) | 72.55 | 71.35 | 71.25 | 71.75 |
| Polyol 2 (b2) | 1.8 | 1.8 | 1.8 | 1.8 |

TABLE 1-continued

| Experiment | 1 | 2 | 3 | 4 |
|---|---|---|---|---|
| Polyol 3 (b2) | 15 | 15 | 15 | 15 |
| Lupragen ® N 201 | 1.5 | 1.5 | 1.5 | 1.3 |
| Lupragen ® N 206 | 0.15 | 0.15 | 0.15 | 0.15 |
| DC 198 | 1.5 | 1.5 | 1.5 | 1.5 |
| B 8409 | 1.5 | 2.5 | 2.5 | 2.5 |
| Water | 6 | 6.2 | 6.3 | 6 |
| B-component | | | | |
| Lupranat ® T80 | 100 | 100 | | |
| Lupranat ® MI | | | 80 | 80 |
| Lupranat ® M20A | | | 20 | 20 |
| Index | 75 | 75 | 51.8 | 49.5 |
| Gross density$_{free}$(g/l) | 27.5 | 25.5 | 35.8 | 36 |
| Waster absorptivity (%) | 200 | 199 | 156 | 152 |
| Ball indentation hardness (mm) | 35* | 30* | 30** | 25** |

Polyol 1 OH number 42 mg KOH/g, polyetheralcohol based on propylene oxide and ethylene oxide (72% by weight), glycerol initiator, proportion of primary OH groups (77%) (BASF);
Polyol 2 OH number 35 mg KOH/g, polyetheralcohol based on propylene oxide and ethylene oxide (13% by weight), glycerol initiator (BASF);
Polyol 3 OH number 55 mg KOH/g, polyetheralcohol based on propylene oxide, propylene glycol initiator (BASF);
Lupragen ® N 206 Blowing catalyst (BASF);
Lupragen ® N 201 Gel catalyst in ethylene glycol (33%) (BASF);
DC 198 Silicone stabilizer (Air Products);
B 8409 Silicone stabilizer (Goldschmidt);
Lupranat ® MI NCO content 33.6% by weight, 4,4'-MDI and 2,4'-MDI isomer mixture;
Lupranat ® M20A NCO content 31.6% by weight, polyphenylenepolymethylene polyisocyanate;
Lupranat ® T80 NCO content 48.3% by weight, TDI 80/20.
Ball indentation hardness: Indentation depth, measured in mm
*Test ball: weight 880 g (diameter: 55 mm)
**Test ball: Weight 73 g (diameter: 25 mm)
Water absorptivity = [(W$_1$–W$_2$)/W$_1$] × 100
W$_1$ Gross weight of the foam (dry)
W$_2$ Weight of the foam after storage in water.

We claim:
1. A process for the preparation of low-density hydrophilic flexible polyurethane foams comprising reacting organic and/or modified organic polyisocyanates (a) with a polyetherol mixture (b) and, optionally, further compounds (c) having hydrogen atoms reactive toward isocyanates, in the presence of water and/or other blowing agents (d), catalysts (e) and, optionally further assistants and additives (f), wherein the polyetherol mixture (b) comprises
   b1) at least one difunctional or polyfunctional polyetherol based on propylene oxide and/or butylene oxide and ethylene oxide, having an ethylene oxide content of more than 60% by weight, based on the total amount of alkylene oxide used, an OH number of from 20 to 120 mg KOH/g and a content of primary OH groups of more than 20% and
   b2) at least one difunctional to polyfunctional polyetherol free of ethylene oxide and based on propylene oxide and/or butylene oxide and having an OH number of more than 25 mg KOH/g,
   water is used in amounts of up to 15% by weight, based on the total weight of the components (b) to (f), and the catalysts comprise a mixture of gel catalysts and blowing catalysts, and foaming is effected in an index range of from 20 to 120
wherein the amount by weight of (b1) is greater than that of (b2) such that the weight ratio of (b1) to (b2) is from 2:1 to 40:1.
2. A process as claimed in claim 1, wherein the polyol (b1) is used in amounts of more than 50% by weight, based on the total weight of the component (b).
3. A process as claimed in claim 1, wherein the polyol (b2) is used in amounts of less than 30% by weight, based on the total weight of the component (b).

4. A process as claimed in claim 1, wherein the weight ratio of organometallic gel catalysts to blowing catalysts is less than 1.

5. A process as claimed in claim 1, wherein the weight ratio of organometallic gel catalysts to blowing catalysts is less than 1.

6. A process as claimed in claim 1, wherein the catalysts comprise a mixture of amine gel catalysts and organometallic gel catalysts, the weight ratio of gel catalysts to the blowing catalysts being less than 2.

7. A process as claimed in claim 1, wherein the component (e) contains further catalysts in addition to the gel catalysts and blowing catalysts.

8. A process as claimed in claim 1, wherein the foams are prepared in an index range of from 40 to 90.

9. A process as claimed in claim 1, wherein the organic and/or modified organic polyisocyanates (a) comprise tolylene diisocyanate and/or mixtures of diphenylmethane diisocyanates having a 2,4'-isomer content of more than 30% by weight.

10. A process as claimed in claim 1, wherein the organic and/or modified organic polyisocyanates (a) comprise NCO-containing prepolymers formed by reaction of at least parts of the components (a), (b) and, optionally, (c) and/or (d).

11. A process as claimed in claim 10, wherein the organic and/or modified organic polyisocyanates (a) comprise NCO-containing prepolymers which contain the component (b1) at least in a proportionate amount.

12. A process as claimed in claim 1, wherein water is used as the blowing agent (d) in amounts of from 3 to 10% by weight, based on the total weight of the components (b) to (f).

13. A flexible polyurethane foam which is prepared in accordance with a process as claimed in any of claims 1 to 12.

14. A flexible polyurethane foam as claimed in claim 13, wherein the water absorptivity is more than 130%.

15. A process as claimed in claim 1 wherein the weight ratio of (b1) to (b2) is from 3:1 to 7:1.

* * * * *